(12) United States Patent
Fribourg

(10) Patent No.: US 10,002,682 B2
(45) Date of Patent: Jun. 19, 2018

(54) NUCLEAR REACTOR HAVING PLATE OR MICRO-CHANNEL HEAT EXCHANGERS INTEGRATED IN THE VESSEL

(71) Applicant: Société Technique pour l'Energie Atomique Technicatome, Villiers le Bacle (FR)

(72) Inventor: Charles Fribourg, Antony (FR)

(73) Assignee: SOCIETE TECHNIQUE POUR L'ENERGIE ATOMIQUE, Villiers le Bacle (FR)

( * ) Notice: Subject to any disclaimer, the term of this patent is extended or adjusted under 35 U.S.C. 154(b) by 746 days.

(21) Appl. No.: 14/391,683

(22) PCT Filed: Apr. 9, 2013

(86) PCT No.: PCT/EP2013/057412
§ 371 (c)(1),
(2) Date: Oct. 9, 2014

(87) PCT Pub. No.: WO2013/153076
PCT Pub. Date: Oct. 17, 2013

(65) Prior Publication Data
US 2015/0146838 A1    May 28, 2015

(30) Foreign Application Priority Data

Apr. 11, 2012  (FR) ...................................... 12 53327

(51) Int. Cl.
*G21C 9/00* (2006.01)
*G21C 15/24* (2006.01)
(Continued)

(52) U.S. Cl.
CPC ............. *G21C 15/24* (2013.01); *G21C 1/322* (2013.01); *G21C 13/036* (2013.01); *G21C 15/22* (2013.01);
(Continued)

(58) Field of Classification Search
CPC .......... G21C 1/32; G21C 1/322; G21C 1/324; G21C 1/326
See application file for complete search history.

(56) References Cited

U.S. PATENT DOCUMENTS 3,989,100 A * 11/1976 McDonald ............ F28F 9/0246
165/81
4,124,064 A    11/1978 Jabsen et al.
(Continued)

FOREIGN PATENT DOCUMENTS

FR    1540842 A    9/1968
FR    2312092 A1    12/1976

OTHER PUBLICATIONS

International Search Report for corresponding International Application PCT/EP2013/051995.

*Primary Examiner* — Marshall P O'Connor
(74) *Attorney, Agent, or Firm* — Davidson, Davidson & Kappel, LLC

(57) ABSTRACT

A nuclear reactor is provided that includes a vessel; a core provided in the vessel; at least one plate heat exchanger provided in the vessel, with at least one duct for supplying a secondary fluid to the heat exchanger and a duct for discharging the secondary fluid from the heat exchanger, the discharge duct extending through the vessel. The nuclear reactor comprises a device for attaching the heat exchanger to an area of the vessel through which the discharge duct extends.

20 Claims, 6 Drawing Sheets

(51) Int. Cl.
*G21C 13/036* (2006.01)
*G21C 15/22* (2006.01)
*G21C 1/32* (2006.01)
G21C 13/028 (2006.01)
G21C 13/06 (2006.01)

(52) U.S. Cl.
CPC .......... *G21C 13/028* (2013.01); *G21C 13/06* (2013.01); *Y02E 30/40* (2013.01)

(56) References Cited

U.S. PATENT DOCUMENTS

2011/0075786 A1* 3/2011 McWhirter ........... F28D 1/0213
376/405
2011/0293060 A1* 12/2011 Hyde ....................... G21C 1/02
376/356
2012/0321030 A1* 12/2012 Malloy .................. G21C 13/02
376/361

* cited by examiner

NUCLEAR REACTOR HAVING PLATE OR MICRO-CHANNEL HEAT EXCHANGERS INTEGRATED IN THE VESSEL

The invention generally relates to nuclear reactors.

More specifically, the invention relates to a nuclear reactor, of the type comprising:
- a vessel.
- a core provided in the vessel.
- at least one plate heat exchanger provided in the vessel,
- at least one duct for supplying a secondary fluid to the heat exchanger and a duct for discharging the secondary fluid from the heat exchanger, the discharge duct extending through the vessel.

In the rest of the text, the term "plate heat exchanger" is considered to cover the following two concepts:
- plate exchangers;
- micro-channel exchangers.

For a low- or medium-power electricity production nuclear reactor, non-limitingly around 100 MW and up to 500 MW, the economic viability is based on the time and investment optimization of the manufacture and maintenance of the reactor. One of the avenues considered in order to improve the viability of this type of reactor is to design certain parts (modules) such that they can be at least partially manufactured, equipped and tested in the plant, then transported to the site to be assembled to other modules there.

In this respect, it is necessary to increase the compactness of the different internal modules making up the reactor so that those modules are transportable.

Embodiments of the invention therefore target the dimensional optimization of the reactor vessel and its inner parts.

BACKGROUND

FR 2348458 describes a nuclear reactor including a plurality of heat exchangers distributed in the vessel around the core of the nuclear reactor. The exchangers proposed in this document have a design based on plate compartment groups, with upstream and downstream collectors for the secondary fluid respectively connected to upstream and downstream bent tube elements having a vertically oriented end.

SUMMARY OF THE INVENTION

The vertical bulk of the vessel in FR 2348458 for this type of reactor is not optimal, and a new architecture is provided herein, with the aim of meeting the aforementioned requirements of configurability and compactness.

In that context, a nuclear reactor of the aforementioned type is provided, characterized in that the reactor comprises a device for attaching the heat exchanger to an area of the vessel through which the discharge duct extends.

Thus, the same zone of the vessel allows both the attachment of the heat exchanger and the passage of the discharge duct. This contributes to making the nuclear reactor particularly compact. In particular, the secondary fluid discharge duct is particularly short. That duct therefore takes up practically no space inside the vessel, which frees up space to house other inner parts of the reactor.

This is in particular the case when the heat exchanger has a secondary fluid outlet orifice connected to the secondary fluid discharge duct, the attachment device comprising a plurality of attachment members distributed from the outlet orifice. Thus, the same members make it possible to attach the heat exchanger to the vessel and to connect the outlet orifice to the discharge duct. Such an arrangement is particularly compact.

In that case, the heat exchanger advantageously includes a flange for attaching the heat exchanger to the vessel, surrounding the secondary fluid outlet. Such a fastening method is particularly robust and compact.

The nuclear reactor comprises one or more plate exchangers, for example a least four plate exchangers. In specific embodiments, it includes four or six plate exchangers, all provided in the vessel.

This heat exchanger is provided near the vessel, and is preferably attached by a single attaching device that is cantilevered relative to the wall of the vessel. Such an attachment method makes it possible to free the central zone of the vessel so as to install other equipment there, or partitions making it possible to channel the flow of the primary fluid.

The nuclear reactor is for example a pressurized water reactor. The primary fluid of the reactor is then water, as is the secondary fluid. In that case, the heat exchanger is a steam generator, the secondary fluid penetrating the vessel in the liquid state, and being vaporized in the heat exchanger under the effect of the heat ceded by the primary fluid.

The primary and/or secondary fluids could be different from water, and for example a liquid metal such as sodium or a gas. The heat exchanger may be different from a steam generator.

The vessel is typically at least partially filled with the primary fluid.

The primary fluid is heated in the core of the reactor, and flows from the core to one or more primary fluid inlets formed in the plate exchanger(s). After passing through the plate exchanger, the primary fluid circulates as far as a suction inlet of the primary pump, which discharges the primary liquid to the core. Typically, the moving part of the primary pump is housed inside the vessel. Alternatively, the primary pump is completely situated outside the vessel and connected to the vessel by ducts.

The vessel includes inner partitions making it possible to channel the flow of the primary fluid between the core, the heat exchanger, and the primary pump(s).

As indicated above, the heat exchanger is typically attached to the vessel by a plurality of attachment members, positioned around a downstream crossing making it possible to discharge the secondary fluid through the vessel and around the secondary fluid outlet orifice of the exchanger. In one non-preferred alternative, the attachment members for attaching the heat exchanger to the vessel are not placed around the downstream crossing and the orifice. They can for example be positioned in an area adjacent to the crossing.

The device for attaching the heat exchanger to a zone of the vessel here refers to the device provided to bear the weight of the exchanger, as well as the main thermomechanical stresses, and to pass them on to the vessel.

Typically, the attachment device situated in the zone of the vessel passed through by the discharge duct bears at least 70% of the weight of the exchanger. Advantageously, it bears 100% of the weight of the exchanger. Thus, in that case, the heat exchanger is fully supported by the attachment device connected to the zone of the vessel passed through by the discharge duct. It is therefore attached to a single zone of the vessel. This is particularly advantageous, since the heat exchanger can expand thermally. This is particularly important due to the fact that the heat exchanger is of the plate type, and therefore has a relatively solid metallic structure.

Advantageously, the vessel has a substantially vertical central axis, the attachment device attaching an upper end of the heat exchanger to the vessel. Thus, the upper end of the exchanger constituting a stationary point, the thermal expansion of the heat exchanger is done in a downward direction. This contributes to minimizing the stresses in the heat exchanger.

Preferably, the nuclear reactor comprises a guide device suitable for limiting the travel of the lower part of the heat exchanger in a horizontal plane, and allowing a movement of said lower part in the vertical direction relative to the vessel. Thus, the heat exchangers are guided in the lower part, so as to prevent them from pivoting or toppling in the event of a bias of the impact or earthquake type. However, because the lower part is free in the vertical direction, the thermal expansion of the heat exchanger remains possible.

Advantageously, the attachment device removably attaches the heat exchanger to the vessel. Thus, it is easy to remove the heat exchanger from the vessel, for example for maintenance purposes.

The attachment device is for example of the screw or tie rod type, or any other suitable type.

Advantageously, the attachment device comprises a plurality of attachment members attaching the heat exchanger to the vessel, said attachment members being able to be disassembled from outside the vessel. Thus, it is not necessary to insert remotely controlled tools inside the vessel to disassemble the heat exchanger. This makes the disassembly of the heat exchanger faster and more convenient. Furthermore, the attachment members are easier to access from outside the vessel, the inside of the vessel generally being cluttered by the inner members of the nuclear reactor.

Typically, the heat exchanger comprises a plurality of plates stacked parallel to one another, the discharge duct passing through the vessel in a substantially radial direction relative to a central axis of the vessel, the plates being substantially perpendicular to said radial direction.

Thus, the plates are provided so as to be tangent to a circle centered on the central axis of the vessel. Such an arrangement makes it possible to arrange the collector collecting the secondary fluid leaving the heat exchanger, here called downstream secondary collector, easily such that it is aligned with the discharge duct.

In fact, the secondary fluid discharge duct typically includes a downstream crossing provided in an orifice of the vessel. That downstream crossing inwardly delimits a passage for the secondary fluid leaving the heat exchanger. It is fluidly connected to the secondary circuit of the reactor. That passage extends substantially radially relative to the central axis of the vessel. Due to the orientation of the plates, the downstream secondary collector also has a substantially radial orientation and can easily be placed immediately next to the discharge duct. The discharge duct is thus kept minimal.

Advantageously, the downstream secondary collector extends through the plates. It is typically made up of openings cut into the plates and placed so as to coincide with each other. This makes it possible to build a collector with a radial orientation easily, and contributes to increasing the compactness of the exchanger. In one non-preferred alternative, it is attached on the plates, for example outside the plate mass.

A crossing here refers to a solid part, rigidly attached to the vessel. Typically, the attachment device attaches the heat exchanger directly to the crossing. This makes it possible to arrange the attachment device more easily, in particular the orifices allowing the passage of screws or tie rods.

Typically, the attachment members are distributed around the passage formed in the crossing. The flange placed around the outlet of the heat exchanger is pressed against an inner face of the crossing. The attachment members are attached to the flange by one end. Typically, they extend completely through the crossing and have a head accessible from the outside of the vessel.

Preferably, at least one sealing gasket is interposed between the flange and the inner face of the crossing. Typically, one or more pairs of annular seals are provided around the inner passage at the crossing. Leak detection channels advantageously emerge between each pair of seals.

Preferably, these attachment members and the downstream crossing can be removed from the vessel from the outside of the vessel. The downstream crossing is in that case for example engaged in an orifice of the vessel and attached to the outer surface of the vessel so as to be able to be disassembled. It is for example attached using a device of the screw or tie rod type, or any other suitable type.

This makes it possible to access the sealing gaskets interposed between the flange and the inner face of the crossing, in particular for maintenance thereof. These seals are advantageously secured to the crossing, and are removed from the vessel with the crossing.

Preferably, the reactor comprises a ring provided to keep the heat exchanger suspended from the vessel after the downstream crossing has been removed from the vessel. That ring normally surrounds both the flange of the exchanger and the inner end of the crossing. It is engaged in the receiving orifice of the crossing.

Alternatively, the attachment device attaches the heat exchanger directly to the vessel, around or next to the crossing.

Advantageously, the supply duct supplying the heat exchanger with secondary fluid comprises an upstream crossing extending through the vessel, and a plurality of flexible ducts connecting the upstream crossing to the heat exchanger.

A flexible duct here refers to ducts with small diameters, able to deform elastically under the effect of the thermal expansion of the plate exchanger. A single duct connecting the upstream crossing to the heat exchanger would have a larger diameter and higher stiffness than several ducts with smaller diameters. The crossing and the plate heat exchanger are two solid parts. It is necessary to create a flexible link between those two parts so as to allow the plate exchanger to travel relative to the crossing. That travel is obtained through deformation of the flexible ducts. The flexible ducts may in particular include bends, which contribute to increasing the flexibility of the ducts under the effect of the relative movements of the attachment points or ends of the ducts. Such bends are more difficult to obtain on ducts with large diameters.

Typically, the heat exchanger comprises at least one upstream secondary collector supplying the heat exchanger with secondary fluid, that upstream secondary collector and the upstream crossing being connected to each other by the flexible ducts.

The upstream secondary connector extends through the plates. It is typically made up of openings cut into the plates and placed so as to coincide with each other.

A plate exchanger typically has channels, in particular micro-channels. It comprises primary and secondary plates alternatingly stacked around each other. The primary plates each have a first large face in which flow channels are hollowed out for the primary fluid, called primary channels, and a second large face without channels. The primary channels are open at the first large face. Likewise, the secondary plates each have a first large face in which flow channels are hollowed out for the secondary fluid, called secondary channels, and a second large face without channels. The secondary channels are open at their first large face. When the plates are assembled to each other, the first large faces of the primary plates are pressed against the second large faces of the secondary plates. The primary channels are therefore closed off at the first large faces. Likewise, the first large faces of the secondary plates are pressed against second large faces of the primary plates. The secondary channels are also closed off at the first large faces. Such an architecture makes it possible to obtain a very compact and very robust exchanger.

Typically, the primary and secondary channels are etched. Such a method for obtaining channels is very convenient, in particular when it is necessary to produce a large number of channels with small sections.

In one non-preferred alternative, the plate exchangers are not of the etched plate type. The channels are mechanically or laser machined or are formed by inserts placed between the plates.

Alternatively, the channels are made by hollowing out the two large faces across from the primary and secondary plates. In this alternative, the two large faces of each primary and secondary plate bear half-channels.

According to still another alternative, the exchanger does not include channels, the primary and secondary fluids circulating between the plates without being channeled in channels.

Preferably, the primary and secondary plates are welded to each other by diffusion. This assembly method makes it possible to obtain a very robust link between the plates, and allows the exchanger to withstand significant pressure differences between the primary side and the secondary side. In one non-preferred alternative, the plates are assembled to each other by other means. They may be welded inside plates, or assembled by screws or tie rods.

Advantageously, the heat exchanger comprises a plurality of primary channels delimited between the plates and traveled by the primary fluid, each primary channel having a main inlet and a main outlet, the exchanger having at least one hood delimiting a water tank, in which the main inlets or the main outlets emerge.

The heat exchanger may include only one hood, covering the main inlets. It may also include only one hood, covering the main outlets. It may also include two hoods, one covering the main inlets and the other covering the main outlets.

The hood covering the main inlets serves, inter alia, to distribute the primary fluid uniformly in the different primary channels. It has an orifice emerging in the inner volume of the vessel, through which the primary fluid penetrates the water tank. The purpose of the hood covering the primary outlets is to capture the primary fluid having come out of the primary channels, and to channel it toward a duct, for example toward the primary pumps.

As indicated above, the heat exchangers are typically elongated in the vertical direction. The main inlets emerge at one of the ends of the heat exchanger, for example the upper end. The main outlets emerge at the other end of the exchanger, for example the lower end. The hood(s) are therefore positioned at the upper and/or lower ends of the heat exchanger. Alternatively, the primary fluid flows from bottom to top, the main inlets and outlets respectively emerging at the lower and upper ends of the exchanger.

The hood(s) are typically attached on the block made up of the plates assembled to each other. It is advantageously provided to be able to be disassembled, so as to allow the inspection or operations of the primary channels. It is for example screwed on the plates. Alternatively, it is welded on the plates.

According to a first embodiment, the vessel includes a shroud and a cover attached on the shroud so as to be able to be disassembled, the heat exchanger(s) being attached to the cover. Thus, it is particularly easy to remove the heat exchangers from the vessel of the reactor. They are discharged in one piece with the cover.

According to a second embodiment, the reactor comprises absorbers for controlling the reactivity of the core, which are vertically movable relative to the core, the absorbers being situated above the core and the heat exchanger(s) being situated above the absorbers. The absorbers are clusters, crosses or any other suitable shape.

More specifically, the absorbers can be moved between a first position removed outside the core, in which the absorbers are situated vertically between the heat exchangers and the core, and a plurality of positions in which those absorbers are partially or completely inserted inside the core.

In that case, the reactor comprises mechanisms provided to maneuver the absorbers selectively, the mechanisms for maneuvering the absorbers comprising actuators placed vertically above the heat exchangers, and rods connecting the actuators to the absorbers, the nuclear reactor having several heat exchangers distributed around the rods.

Typically, the actuators are placed above the cover of the vessel and are supported by the cover.

The heat exchangers are placed along the shroud of the vessel, which frees a significant free volume in the middle of the vessel to allow the rods to pass.

In the first embodiment, the mechanisms for maneuvering the absorbers for controlling the reactivity of the core are housed vertically between the heat exchangers and the core.

BRIEF SUMMARY OF THE DRAWINGS

Other features and advantages of the invention will emerge from the detailed description thereof provided below, for information and non-limitingly, in reference to the appended figures, in which.

DETAILED DESCRIPTION

Figure 1:
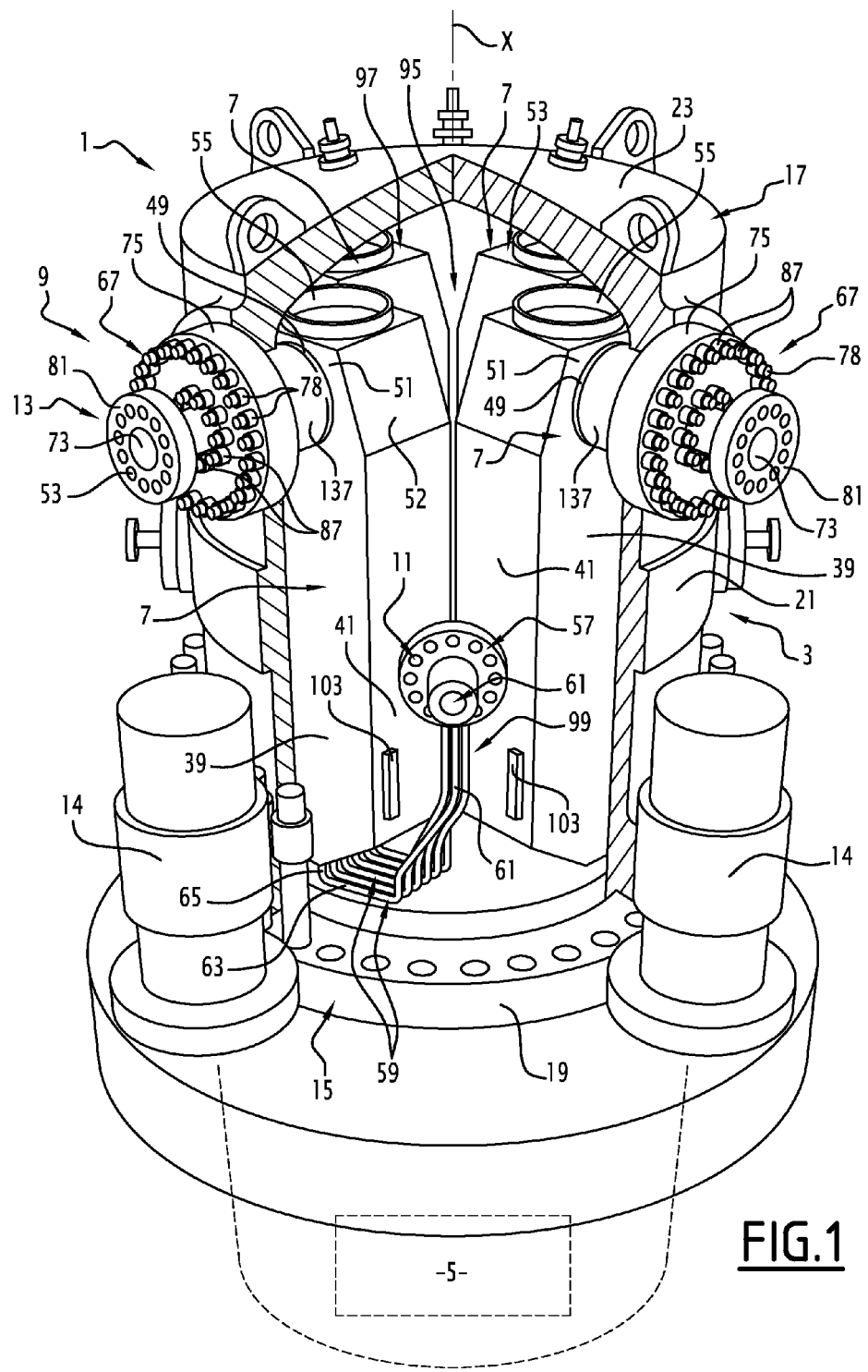
FIG. 1 is a perspective view of the upper part of the nuclear reactor according to a first embodiment of the invention, part of the vessel being cut away to expose the heat exchangers.

The nuclear reactor 1 partially shown in FIG. 1 is of the PWR type. It comprises:

a vessel 3;

a core 5, provided in the vessel 3;

four one plate heat exchangers 7 provided in the vessel 3;

a secondary circuit 9, comprising, inter alia, for each heat exchanger, a duct 11 for supplying a secondary fluid to the heat exchanger and a duct 13 for discharging the secondary fluid from the heat exchanger;

members ensuring the flow of the primary fluid inside the vessel 3, in particular pumps 14 and inner partitions.

The vessel 3 is oriented vertically, and has a vertical central axis X. It includes, in the lower part, a shroud 15, which is only partially shown in FIG. 1, and a lower bottom, shown diagrammatically, secured to the shroud. The vessel 3 also includes a cover 17 removably attached on the upper peripheral edge 19 of the shroud 15. The cover 17 in turn includes a peripheral wall 21, coaxial to the axis X, and an upper bottom 23 closing the wall 21 at an upper end thereof.

The exchangers 7 are exchangers of the etched plate type.

Figure 4:
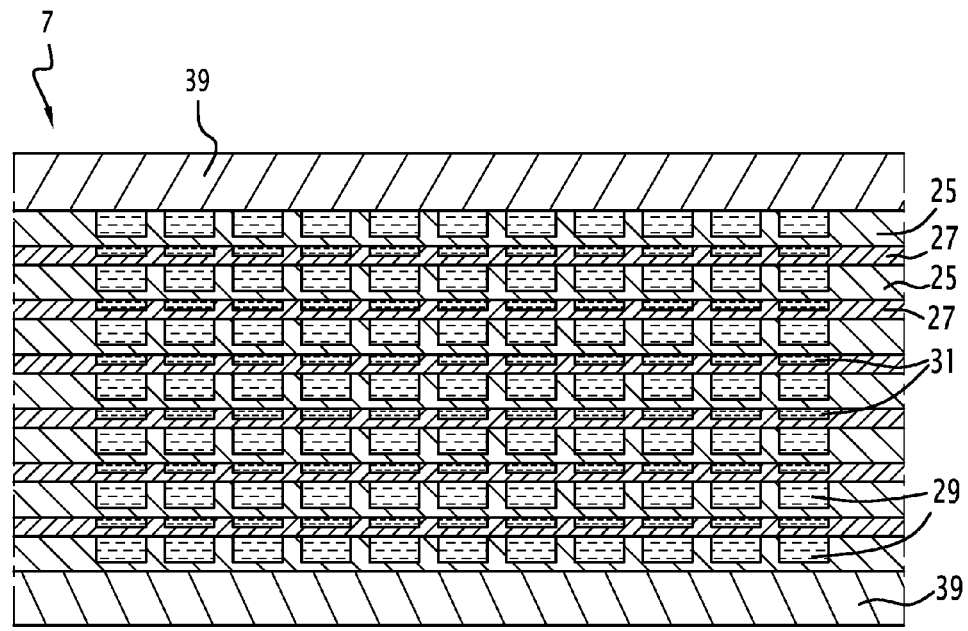
FIG. 4 is a cross-sectional, partial diagrammatic illustration of the heat exchanger of FIG. 3.
Figure 5:
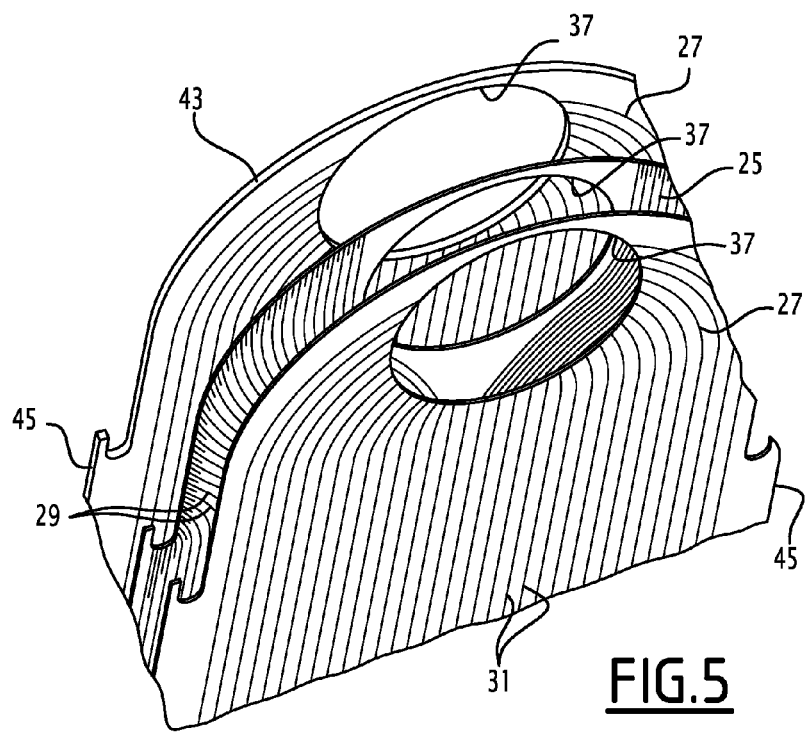
FIG. 5 is an exploded perspective view of the plates of the heat exchanger of FIG. 4.

As shown in FIGS. 4 and 5, each heat exchanger 7 includes a plurality of primary plates 25 and a plurality of secondary plates 27, stacked alternating on one another. Each primary plate 25 has a first large face in which flow channels 29 are hollowed out for the primary fluid. The second large face does not have channels.

Likewise, each secondary plate 27 has a first large face in which a plurality of channels 31 are hollowed out that are provided for the flow of the secondary fluid. The second large face does not include channels. Thus, the channels hollowed in a given primary plate 25 are closed off laterally by the second large face of the secondary plates 27 situated immediately higher in the stack. Likewise, the secondary channels 31 in a given plate are close to the second large face of the primary plate 25 situated immediately higher in the stack.

The primary and secondary plates are welded to each other by diffusion.

The heat exchanger 7 includes an upstream secondary collector 33 (FIG. 3) supplying the secondary channels 31 with secondary fluid, and a downstream secondary collector 35 collecting the secondary fluid leaving the secondary channels 31. The upstream secondary collector 33 is made up of openings (not shown) cut into the primary and secondary plates 25, 27 and placed coinciding with each other. The downstream secondary collector 35 is also made up of openings 37, visible in FIG. 5, cut into to the primary and secondary plates and placed matching each other. The secondary channels 31 each emerge at an upstream end in the upstream secondary collector 33, and emerge at a downstream end in the downstream secondary collector 35.

Each exchanger 7 also includes four other plates 39 and 41. The plates 39 also cover the large faces of the primary or secondary plates situated highest and lowest in the stack of plates in the illustration of FIG. 4, and one of the outer plates 39 covers the first large face of the primary plate situated at the apex of the stack. The other outer plate 39 covers the second large face of the primary plate situated at the very bottom of the stack of plates.

Figure 3:
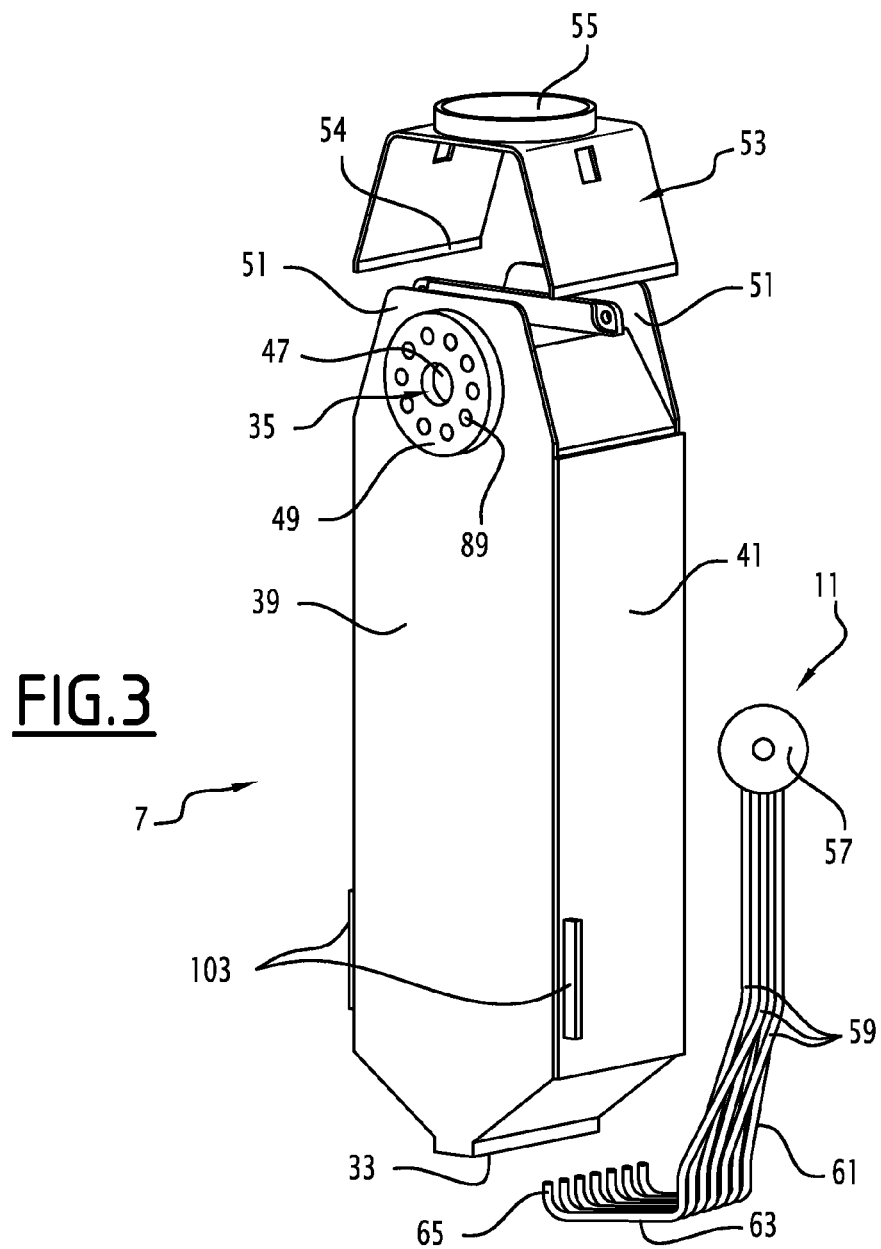
FIG. 3 is a partially exploded perspective view of a heat exchanger of the nuclear reactor of FIGS. 1 and 2.

As shown in FIG. 3, however, the plates have an elongated shape in the vertical direction. The downstream secondary collector 35 extends through an upper end of the plates, the upstream secondary collector 33 extending through a lower end of the plates. The plates are therefore each delimited (FIG. 5) by an upper edge 43 turned upward, by a lower edge (not shown) turned downward, and by two opposite lateral edges 45.

The lateral outer plates 41 cover the lateral edges 45 of the primary and secondary plates 25, 27.

The upstream and downstream secondary collectors 33 and 35 are elongated in a direction perpendicular to the primary and secondary plates 25, 27 and the outer plates 39. The upstream secondary collector 33 is closed at the two outer plates 39. The downstream secondary collector 35 is closed at the plates 39 but extends through the other outer plate 39 by an outlet orifice 47, shown in FIG. 3. The outer plate 39 has, around the orifice 47, a boss 49 forming a flange for attaching the exchanger 7 to the wall 21 of the cover.

The primary channels 25 each have an inlet end emerging at the upper edge 43 of the primary plates, and an outlet end emerging at the lower edge of the primary plates.

As shown in FIG. 3, the lateral plates 39 each have an extension 51 extending past the upper edges 43 of the primary and secondary plates. The exchanger also includes an upper hood 53 delimiting, with the two extensions 51, a water tank 54 that caps the upper edges 43 of the plates. The primary channels 29 emerge by their respective inlet ends in the water tank. Furthermore, the upper hood 53 includes an inlet 55 putting the water tank in communication with the inside of the vessel. One thus obtains a homogenous distribution of the primary fluid in the different primary channels 29. In other words, the primary fluid flow rate in the different primary channels is substantially the same.

In the illustrated alternative embodiment, the exchanger does not include a hood on the lower side. The primary channels 29 emerge by their respective outlet ends directly in the inner volume of the vessel.

The secondary supply duct 11 includes, as shown in FIGS. 1 and 3, an upstream wall crossing 57 and a plurality of flexible ducts 59.

The peripheral wall 21 of the vessel cover includes an orifice in which the wall crossing 57 is engaged. The latter is rigidly attached to the vessel cover and is sealably linked to the edge of the orifice. The crossing 57 has an inner passage 61 through which the secondary fluid extends through the wall 21. The inner passage 61 is fluidly connected in the upstream direction to a secondary fluid flow pump. The inner passage 61 is fluidly connected in the downstream direction to the flexible duct 59. The secondary fluid extending through the wall 21 via the passage 61 is distributed in the different flexible ducts 59.

As shown in FIGS. 1 and 3, the flexible ducts 59 are tubes with small diameters for example in light of the cross-section of the exchanger 7. They are each in the general shape of an asymmetrical U. Each duct 59 has, from the crossing 57, a first branch 61 extending downward, then a substantially horizontal intermediate part 63, and lastly a second branch 65 that is much shorter than the first branch 61, rising upward from the horizontal part 63. The second branch 65 emerges in the secondary upstream collector 33. The first branch 61 has several bends with strong curve radii.

Figure 2:
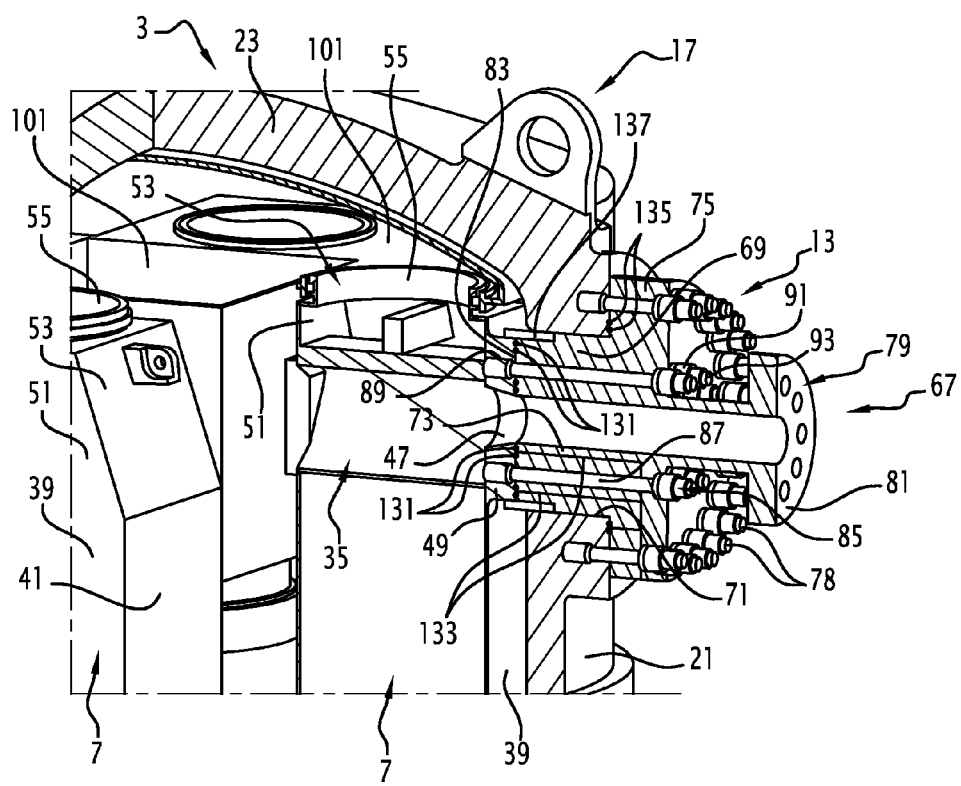
FIG. 2 is an enlarged view of a zone of the nuclear reactor of FIG. 1, part of the structure being cut away to expose the downstream secondary collector of an exchanger and the corresponding downstream crossing.

Each discharge duct for the secondary fluid 13 also includes a wall crossing 67, mounted in an orifice of the peripheral wall 21 of the cover. As shown in FIG. 2, the crossing 67 includes a cylindrical main segment 69 engaged in the orifice 71 of the wall 21, inwardly delimiting a passage 73 for the secondary fluid. The main segment 69 protrudes both toward the inside of the vessel by an inner end, and toward the outside of the vessel. The crossing 67 also includes a flange 75, in a single piece with the segment 69, extending radially around the outer end of the main segment 69.

The passage 73 extends in a substantially radial direction relative to the vertical central axis X of the vessel. The collar 75 is pressed against the outer surface of the vessel cover and rigidly attached to that cover by tie rods 78. The main segment 69 extends toward the outside of the vessel, beyond the collar 75, by a mushroom head 79. The mushroom head 79 ends with a flange 81. The passage 73 extends completely through the mushroom head 79 and emerges at the center of the flange 81. The flange 81 makes it possible to connect the crossing to a line (not shown) connecting the heat exchanger to a steam turbine. The main segment 69 of the crossing is delimited toward the inside of the vessel by an annular surface 83 surrounding the passage 73. The annular surface 83 extends in a plane substantially perpendicular to said radial direction along which the passage 73 extends. It forms a bearing step for the flange 49.

Furthermore, a device 85 ensures the attachment of the heat exchanger 7 to the vessel. This device 85 includes a plurality of tie rods 87 securing the exchanger 7 to the crossing 67. The tie rods each have one end screwed into an orifice 89 formed in the flange 49. They extend over the entire length of the main segment 69, through the latter, and protrude on the face of the collar 75 turned toward the outside of the vessel. Nuts 91 are screwed on the protruding ends 93 of the tie rods. The tie rods 87 are regularly distributed around the passage 73 and the orifice 47. The tie rods 87 thus bias the flange 49 against the annular surface 83 of the crossing. In that position, shown in FIG. 2, the passage 73 is placed coinciding with the outlet 47.

More specifically, the downstream secondary collector 35 is aligned with the passage 73, in a radial direction. The downstream secondary collector 35 and the passage 73 are both rectilinear, and placed in the extension of one another.

Annular sealing gaskets 131 are interposed between the flange 49 and the annular surface 83. In the illustrated example, two pairs of seals 131 are positioned around the passage 73. A leak detection channel 133 emerges between each pair of seals. The seals 131 are each placed in a groove, formed on the annular surface 83, and are secured to the surface.

At least one pair of annular sealing gaskets 135 is interposed between the flange 75 and the outer surface of the cover of the vessel.

As indicated above, the tie rods 78 and the tie rods 87 are can be disassembled from the outside of the vessel 3. Once the tie rods are removed, it is possible to remove the wall crossing 67 outside the orifice 71 of the vessel, in particular to perform maintenance on the sealing gaskets 131 and 135.

A ring 137 is provided to keep the heat exchanger suspended from the vessel cover once the crossing 67 is removed from the orifice. That ring 135 normally surrounds both the flange 49 and the end of the main segment 69 of the crossing. It is engaged in the orifice 71 and interposed radially between the segment 69 and the wall of the orifice. During the period of time where the crossing 67 is removed from the orifice, the exchanger 3 is radially wedged between the inner partitions and the vessel, and is supported and maintained in the axis of the crossing by the ring 137.

In that situation, the heat exchanger 7 is mounted cantilevered, in the immediate vicinity of the peripheral wall 21 of the vessel cover.

As shown in FIG. 1, the four heat exchangers 7 are positioned around the axis X at 90° from each other. The central zone 95 of the vessel, between the four exchangers 7, is thus freed and allows the flow of the primary fluid from the core of the reactor upward, to the upper bottom 23. The volume 97 situated immediately below the upper bottom 23 is free, the primary fluid flowing from that volume into the water tanks 54 of the four exchangers through the orifices 55.

The secondary flow ducts 11 are positioned in the volumes 99 of the vessel situated between two exchangers 7. These volumes 99 are delimited radially toward the outside by the peripheral wall 21 and are delimited toward the inside of the vessel by the lateral plates 41 of the two exchangers 7.

The nuclear reactor also includes inner partitionings such as the partitions 101 shown in FIG. 2, arranged to guide the flow of the primary fluid inside the vessel. The partitions 101 in particular guide the flow of the primary fluid from the core through the volume 95 up to the volume 97, from the elements of the primary channels to the sections of the primary pumps, and also from the discharge of the primary pumps to the core.

Only part of these partitions is shown in FIGS. 1 and 2.

Each exchanger 7 is fastened to the side wall 21 using only the flange 49. In other words, each exchanger 7 is rigidly attached to the vessel by its upper end, its lower end not being rigidly attached to the vessel. However, the exchanger is guided in the lower part so as to prevent pivoting of the exchanger around a vertical axis or toppling in case of bias of the impact or earthquake type. To that end, the outer lateral plates 41 each bear a raised portion 103. This raised portion assumes the shape of a vertically elongated stick. The raised portions 103 cooperate with guideways (not shown), for example borne by inner partitions 101. The raised portions 103 are free to slide in the vertical direction inside the guideways, thus allowing the downward expansion of the exchanger.

When the reactor is operating, the primary fluid is heated in the core 5 of the reactor. After having crossed through the core 5 of the reactor, it flows toward the top of the vessel, in particular through the volume 95 to the volume 97 situated below the upper bottom of the cover. It penetrates the water tanks 54 of the heat exchangers 7 through the orifices 55 and is distributed in the primary channels 29. It leaves the primary channels of the lower end of the heat exchangers 7 and is channeled by the partitions 101 to the sections of the primary pumps 14. The primary pumps 14 discharge the primary fluid to the core 5 of the reactor.

The secondary fluid penetrates the vessel 3 of the reactor through the passages 61 formed in the upstream crossings 57. At the outlet of passages 61, it is distributed in the flexible ducts 59. The flexible ducts 59 conduct the secondary fluid to the upstream secondary collectors 33. In each exchanger 7, the secondary fluid is distributed by the upstream secondary collector 33 in the secondary channels 31 of the heat exchanger. The secondary fluid is vaporized under the effect of the heat ceded by the primary fluid. The steam is collected by the downstream secondary collector 35, flows in the passage 73 and exits the vessel. It then flows to the turbine, then is condensed. A secondary pump next discharges the secondary fluid to the crossing 57.

In the first embodiment of the invention, the heat exchangers 7 are secured to the cover 3 of the vessel, such that the heat exchangers 7 are removed in a single piece with the vessel cover.

Figure 6:
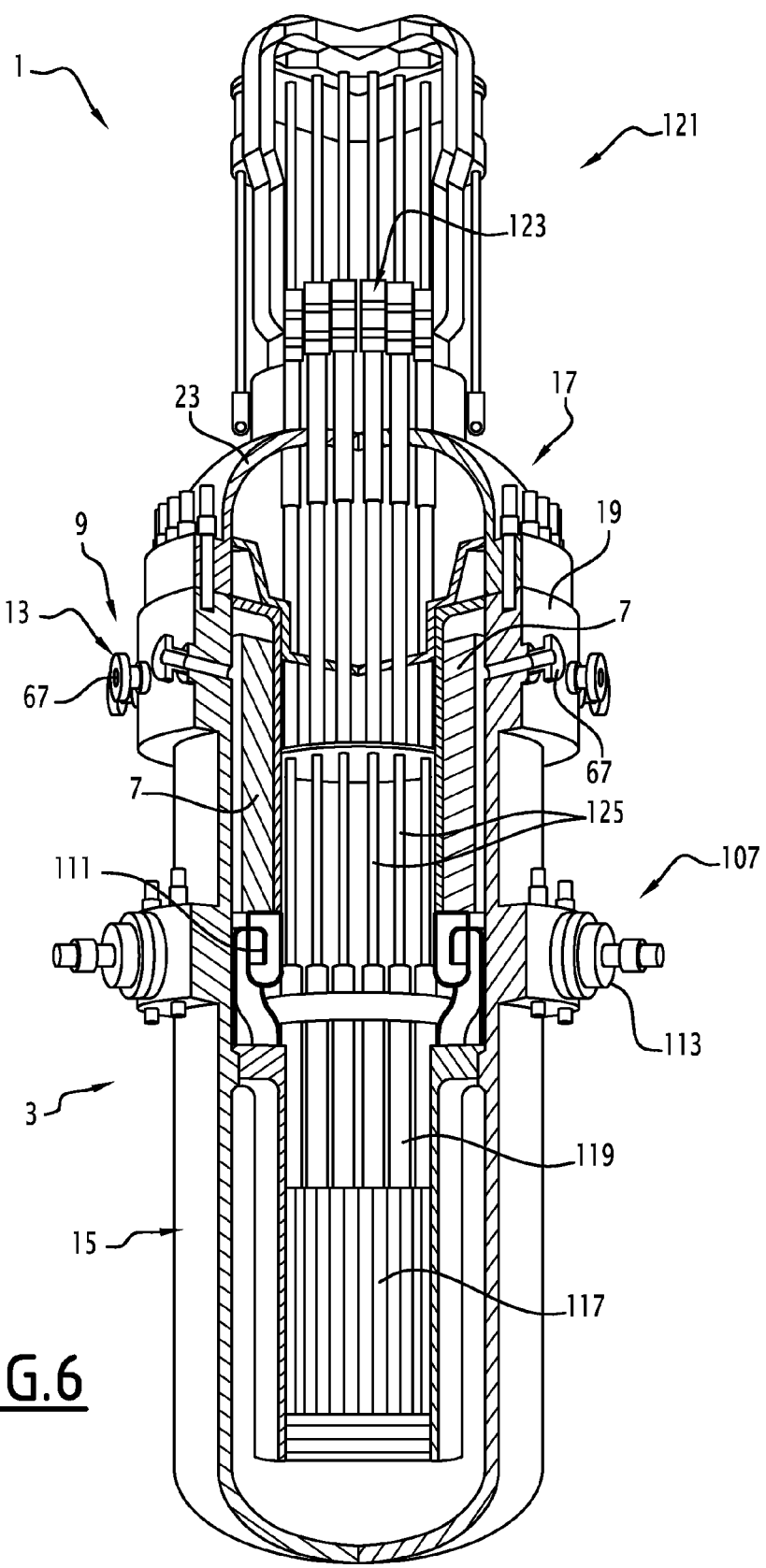
FIG. 6 is a perspective view of a nuclear reactor according to a second embodiment of the invention, part of the structure being cut away to expose the inner equipment of the nuclear reactor.
Figure 7:
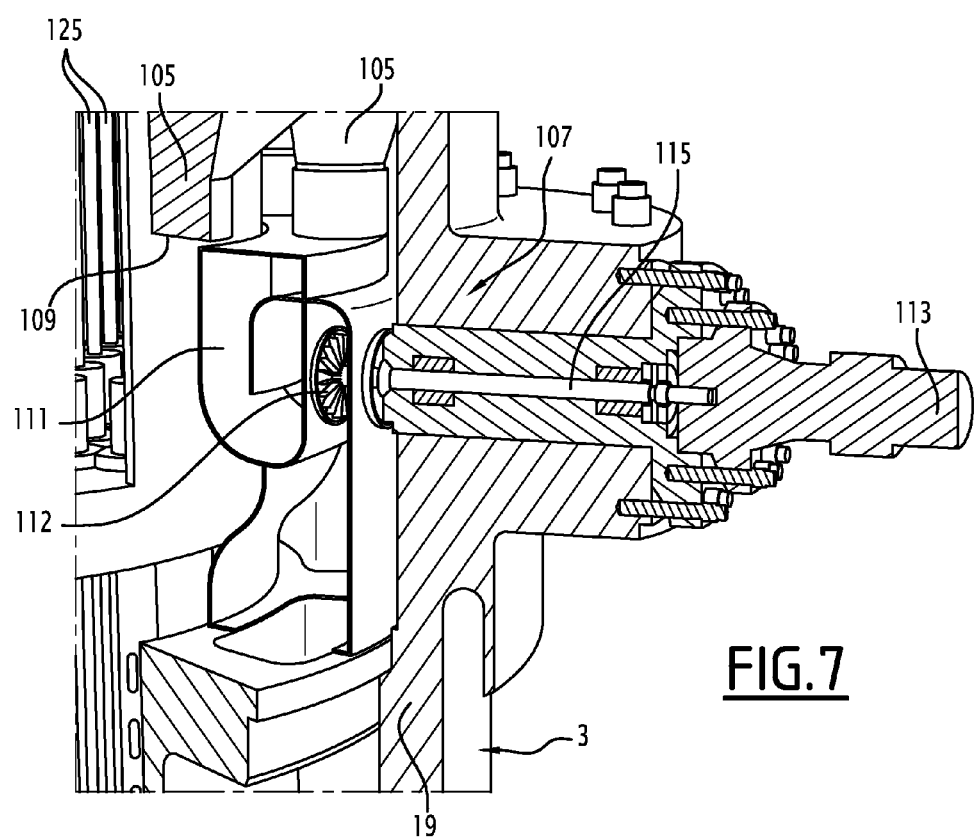
FIG. 7 is an enlarged view of part of the nuclear reactor of FIG. 6, part of the structure being cut away to show the inner elements of the primary pump.

A second embodiment of the invention will now be outlined, in reference to FIGS. 6 and 7.

Only the differences between the second embodiment and the first will be described below. Identical elements or performing elements the same function both embodiments will be designated using the same references.

The nuclear reactor of FIG. 6 includes six heat exchangers 7, distributed circumferentially at 60° from each other around the axis of the vessel.

The heat exchangers 7 are each attached by an attachment device 85 to the shroud 19 of the vessel, and not to the cover.

Each heat exchanger 7 includes a hood 105 (FIG. 7) in its lower part. It does not include a hood 53 in its upper part.

In this second embodiment, the outer plates 39 of the heat exchanger protrude downward relative to the primary and secondary plates. They delimit a water tank with the hood 105. The water tank covers the outlet ends of the primary channels 29, those elements emerging in the water tank.

The hood 105 makes it possible to capture the primary fluid leaving the heat exchanger and to orient it toward the suction of the primary pump 107 shown in FIG. 7. To that end, the hood 105 has an outlet orifice 109 emerging in a duct delimited by inner partitions 111 provided in the vessel. The primary pump 107 includes a rotor 112 embedded in the duct. It also includes a motor 113, and a shaft 115 driving the rotor 112. The motor 113 is provided outside the vessel, the shaft 115 extending through said vessel.

In the nuclear reactor illustrated in FIG. 6, the core 117 of the reactor is situated in the lower part of the vessel. The nuclear reactor also includes a plurality of absorbers 119 that can be moved relative to the vessel, and provided to control the reactivity of the core. The absorbers 119 can each be moved selectively in the vertical direction between a plurality of insertion positions inside the core 117. In the low position, the absorbers 119 are completely inserted inside the core 117. In the upper position, the absorbers 119 are completely removed outside the core. They are then situated above the core 117.

As shown in FIG. 6, the heat exchangers 7 are positioned so as to be situated above the absorbers 119.

The nuclear reactor also includes a mechanism 121 provided to maneuver the absorbers 119. This mechanism comprises actuators 123, and rods 125 with vertical orientations secured to the absorbers 119. The actuators 123 are arranged to move the rods 125 in the vertical direction. The heat exchangers 7 are positioned on the periphery of the vessel, along the shroud 15. They delimit a central passage between them in which the rods 125 are provided. The actuators 123 are supported by the cover 17.

In the embodiment of FIGS. 1 to 5, the heat exchangers 7 are positioned in the vessel cover 17. The maneuvering mechanisms of the absorbers for controlling the reactivity of the core are situated below the heat exchangers.

In the second embodiment, illustrated in FIGS. 6 and 7, the procedure for removing the heat exchangers 7 from the vessel is as follows. The cover 17 is first disassembled and separated from the shroud 19. The actuators 123 and at least part of the rods 125 are removed in a single piece with the cover. Then, the tie rods 87 attaching each exchanger to the vessel are disassembled and each exchanger is individually removed from the vessel.

What is claimed is:

1. A nuclear reactor comprising:
   a vessel;
   a core provided in the vessel;
   at least one plate heat exchanger provided in the vessel;
   at least one secondary fluid supply duct for supplying a secondary fluid to the heat exchanger and a discharge secondary fluid duct for discharging the secondary fluid from the heat exchanger, the discharge secondary fluid duct extending through the vessel; and
   an attachment for attaching the heat exchanger to an area of the vessel through which the discharge secondary fluid duct extends,
   wherein the secondary fluid supply duct supplying the heat exchanger with secondary fluid includes an upstream crossing extending through the vessel, and a plurality of flexible ducts connecting the upstream crossing to the heat exchanger,
   wherein the heat exchanger includes at least one upstream secondary collector supplying the heat exchanger with secondary fluid, the upstream secondary collector and the upstream crossing being connected to each other by the flexible ducts.

2. The nuclear reactor as recited in claim 1 wherein the attachment bears at least 70% of the weight of the exchanger.

3. The nuclear reactor as recited in claim 1 wherein the heat exchanger has a secondary fluid outlet orifice, the secondary fluid discharge duct comprising a downstream crossing extending through the vessel and having an inner passage for the secondary fluid placed to coincide with the outlet orifice, the attachment comprising a plurality of attachers distributed around the inner passage and the outlet orifice.

4. The nuclear reactor as recited in claim 1 wherein the vessel has a substantially vertical central axis, the attachment attaching an upper end of the heat exchanger to the vessel.

5. The nuclear reactor as recited in claim 4 further comprising a guide device suitable for limiting the travel of a lower part of the heat exchanger in a horizontal plane, and allowing a movement of the lower part in the vertical direction relative to the vessel.

6. The nuclear reactor as recited in claim 1 wherein the attachment attaches the heat exchanger to the vessel such that the attachment is disassembleable.

7. The nuclear reactor as recited in claim 6 wherein the attachment includes a plurality of attachers attaching the heat exchanger to the vessel, the attachers disassembleable from outside the vessel.

8. The nuclear reactor as recited in claim 1 wherein the heat exchanger includes a plurality of plates stacked parallel to one another, the secondary fluid discharge duct passing through the vessel in a substantially radial direction relative to a central axis of the vessel, the plates being substantially perpendicular to the radial direction.

9. The nuclear reactor as recited in claim 1 wherein the heat exchanger includes a downstream secondary collector collecting the secondary fluid leaving the heat exchanger, the secondary fluid discharge duct and the downstream secondary collector being aligned with each other.

10. The nuclear reactor as recited in claim 9 wherein the heat exchanger includes a plurality of plates stacked parallel to one another and the downstream secondary collector extends through the plates.

11. The nuclear reactor as recited in claim 1 wherein the heat exchanger includes a plurality of plates stacked parallel to one another and the upstream secondary collector extends through the plates.

12. The nuclear reactor as recited in claim 1 wherein the heat exchanger includes a plurality of plates stacked parallel to one another and heat exchanger includes a plurality of primary channels delimited between the plates and traveled by the primary fluid, each primary channel having a main inlet and a main outlet, the heat exchanger having at least one hood delimiting a water tank in which the main inlets or the main outlets emerge.

13. The nuclear reactor as recited in claim 1 wherein the vessel includes a shroud and a cover attached on the shroud so as to be disassembleable, the heat exchanger being attached to the cover.

14. The nuclear reactor as recited in claim 1 further comprising absorbers for controlling the reactivity of the core, which are vertically movable relative to the core, the absorbers being situated above the core and the heat exchanger being situated above the absorbers.

15. The nuclear reactor as recited in claim 14 further comprising a maneuverer provided to maneuver the absorbers selectively, the maneuverer including actuators placed vertically above the heat exchangers and rods connecting the actuators to the absorbers, the nuclear reactor having several heat exchangers distributed around the rods.

16. The nuclear reactor as recited in claim 1 wherein the secondary fluid discharge duct includes a downstream crossing engaged in an orifice of the vessel, the attachment including a plurality of attachers attaching the heat exchanger to the vessel, the attachers and the downstream crossing being removable from the vessel from outside the vessel.

17. The nuclear reactor as recited in claim 16 further comprising a ring configured for keeping the heat exchanger suspended from the vessel after the downstream crossing is removed from the vessel.

18. The nuclear reactor as recited in claim 1 wherein the secondary fluid discharge duct includes a downstream crossing engaged in an orifice of the vessel, the attachment attaching the heat exchanger directly to the downstream crossing.

19. A nuclear reactor comprising:
a vessel;
a core provided in the vessel;
at least one plate heat exchanger provided in the vessel;
at least one secondary fluid supply duct for supplying a secondary fluid to the heat exchanger and a discharge secondary fluid duct for discharging the secondary fluid from the heat exchanger, the discharge secondary fluid duct extending through the vessel; and
an attachment for attaching the heat exchanger to an area of the vessel through which the discharge secondary fluid duct extends,
wherein the heat exchanger has a secondary fluid outlet orifice, the secondary fluid discharge duct comprising a downstream crossing extending through the vessel and having an inner passage for the secondary fluid placed to coincide with the outlet orifice, the attachment comprising a plurality of attachers distributed around the inner passage and the outlet orifice.

20. A nuclear reactor comprising:
a vessel;
a core provided in the vessel;
at least one plate heat exchanger provided in the vessel;
at least one secondary fluid supply duct for supplying a secondary fluid to the heat exchanger and a discharge secondary fluid duct for discharging the secondary fluid from the heat exchanger, the discharge secondary fluid duct extending through the vessel; and
an attachment for attaching the heat exchanger to an area of the vessel through which the discharge secondary fluid duct extends,
wherein the heat exchanger includes a downstream secondary collector collecting the secondary fluid leaving the heat exchanger, the secondary fluid discharge duct and the downstream secondary collector being aligned with each other,
wherein the heat exchanger includes a plurality of plates stacked parallel to one another and the downstream secondary collector extends through the plates.

* * * * *